June 6, 1967     D. S. FETTERMAN ETAL     3,324,287
APPARATUS FOR MEASURING THE MOMENTUM OF A MOVING VEHICLE
Original Filed June 27, 1962     3 Sheets-Sheet 1
FIG. 1.
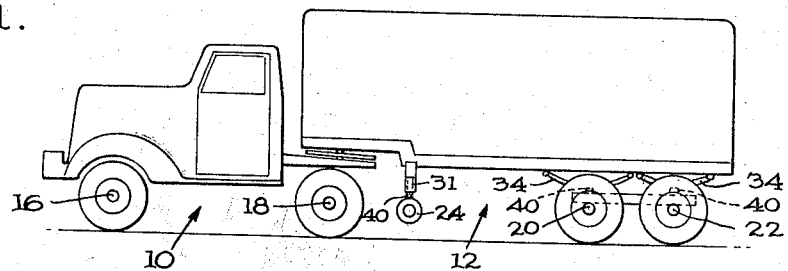
FIG. 2a.
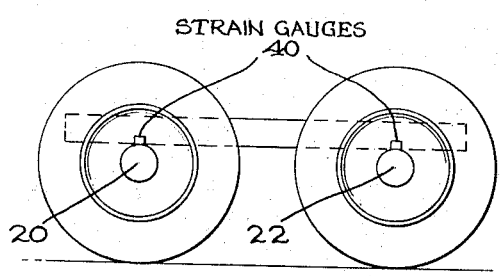
FIG. 2.
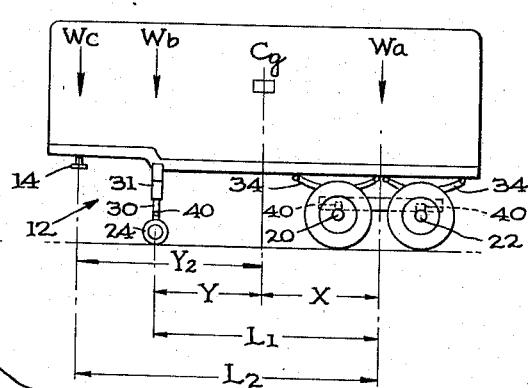
FIG. 3.
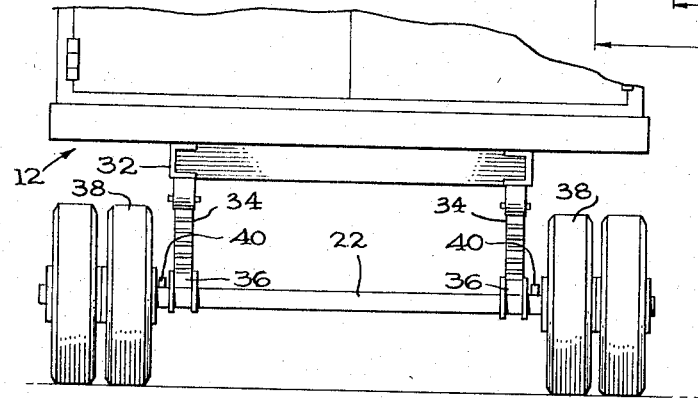
FIG. 4.
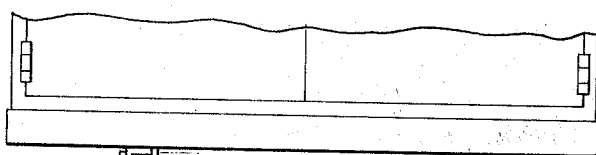
INVENTORS
DAVID S. FETTERMAN
JEROLD B. MUSKIN
BY Robert C. Sullivan
ATTORNEY
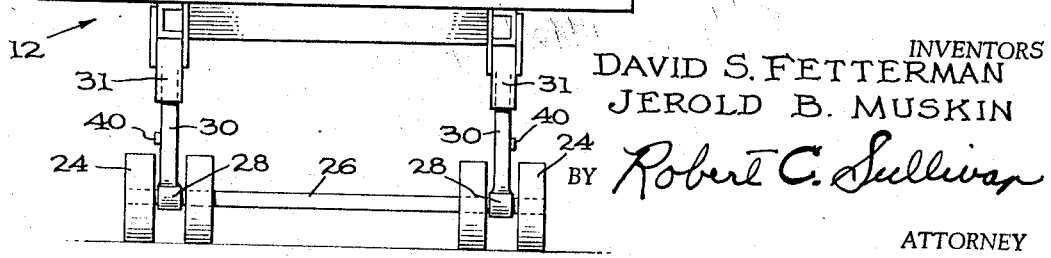

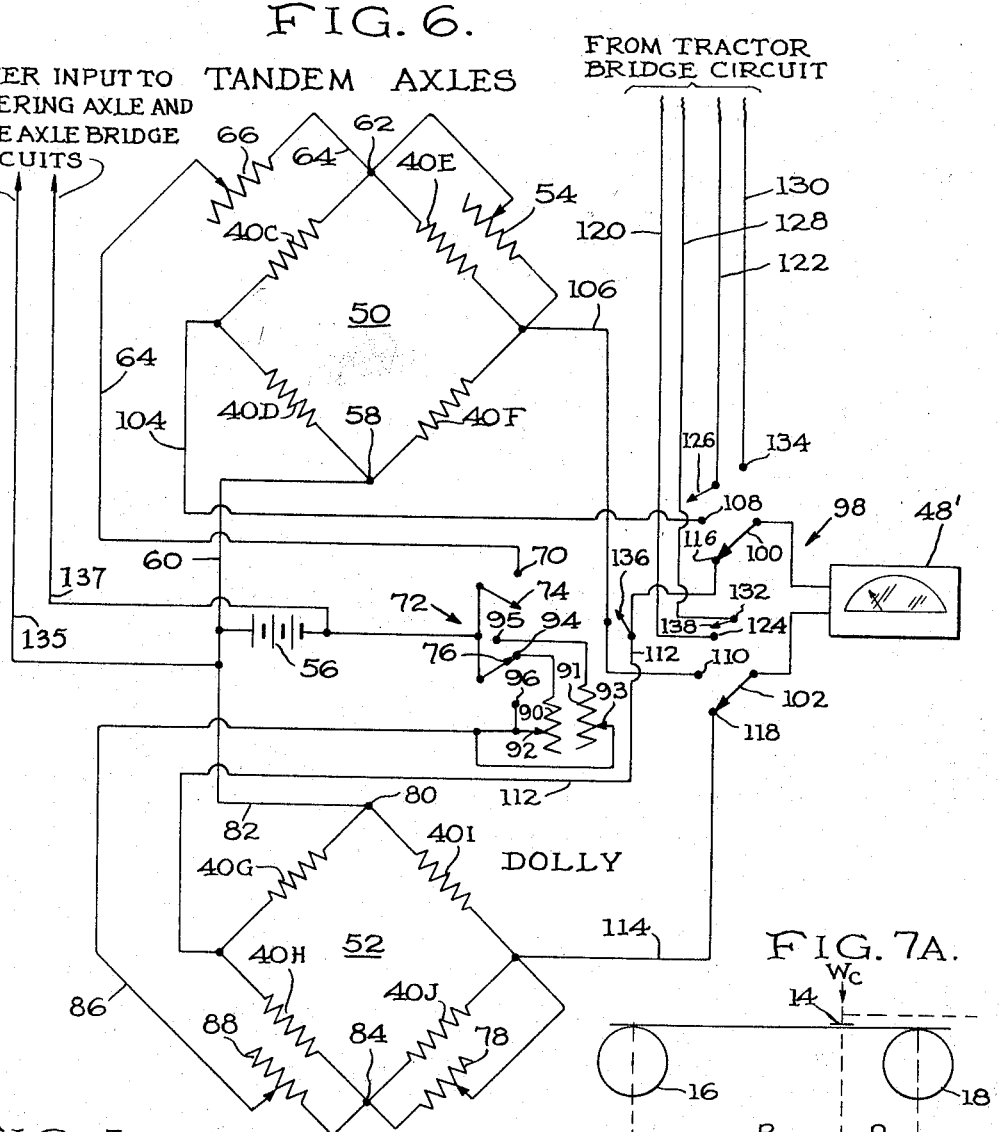

June 6, 1967    D. S. FETTERMAN ETAL    3,324,287
APPARATUS FOR MEASURING THE MOMENTUM OF A MOVING VEHICLE
Original Filed June 27, 1962    3 Sheets-Sheet 3

INVENTORS
DAVID S. FETTERMAN
JEROLD B. MUSKIN
BY Robert C. Sullivan
ATTORNEY

United States Patent Office 3,324,287
Patented June 6, 1967

3,324,287
APPARATUS FOR MEASURING THE MOMENTUM OF A MOVING VEHICLE
David S. Fetterman, 1370 Bell Lane, Maple Glen, Pa. 19002, and Jerold B. Muskin, 615 Oak Shade Ave., Elkins Park, Pa. 19117
Original application June 27, 1962, Ser. No. 205,654. Divided and this application June 13, 1963, Ser. No. 292,513
8 Claims. (Cl. 235—151.3)

This is a division of application Ser. No. 205,654, filed June 27, 1962, now abandoned. This invention relates to an apparatus for measuring and monitoring the momentum of a moving vehicle.

A factor which has been largely ignored in the regulation and monitoring of truck vehicles with respect to the safety of their operation is the fact that the momentum of the vehicle is an even more important safety consideration than the speed of the vehicle, since a heavily loaded truck travelling at high speed is much more potentially dangerous and harder to control than the same truck travelling unloaded or lightly loaded. Yet, as far as we know, little or no development has been done in the prior art to measure the momentum of moving vehicles such as trucks during operation, as an indication of the safety of the vehicle operation.

A feature of the invention is the provision of an apparatus in accordance with which speed and weight measurements of the truck vehicle are continuously combined to provide a continuous indication of the momentum of the moving vehicle. Means may be provided to give an indication of the maximum momentum of the vehicle over a predetermined period, or to continuously record the indicated value of momentum.

Further objects and advantages of the invention will become apparent from the following description taken in conjunction with the accompanying drawings in which:

FIG. 1 is a schematic view in side elevation of a tractor-trailer combination with the trailer hooked to the tractor;

FIG. 2 is a schematic view in side elevation showing the trailer of FIG. 1 unhooked from the tractor and with the dolly wheels of the trailer lowered;

FIG. 2a is an enlarged view in side elevation showing the location of the weight-sensing strain gauges on the tandem axles of the trailer;

FIG. 3 is a view in rear elevation, partially cut away, showing the location of the strain gauge weight sensing devices on one of the tandem axles of the trailer;

FIG. 4 is a front elevation view, partially cut away, showing the location of the strain gauges on the dolly wheel legs of the trailer of FIG. 2;

FIG. 5 is a simplified schematic diagram of the electrical circuit connections of the strain gauges on a single axle;

FIG. 6 is a schematic wiring diagram showing the electrical circuit connections of the strain gauges of the trailer tandem axles, dolly wheels, and of the tractor axles to the indicator or read-out device;

FIG. 7a is a schematic diagram showing a possible position of the kingpin on the trailer relative to the tractor steering axle and to the rear drive axle of a tractor having a single drive axle;

FIG. 7b is a schematic diagram similar to FIG. 7a for a tractor having tandem drive axles;

Figure 8:
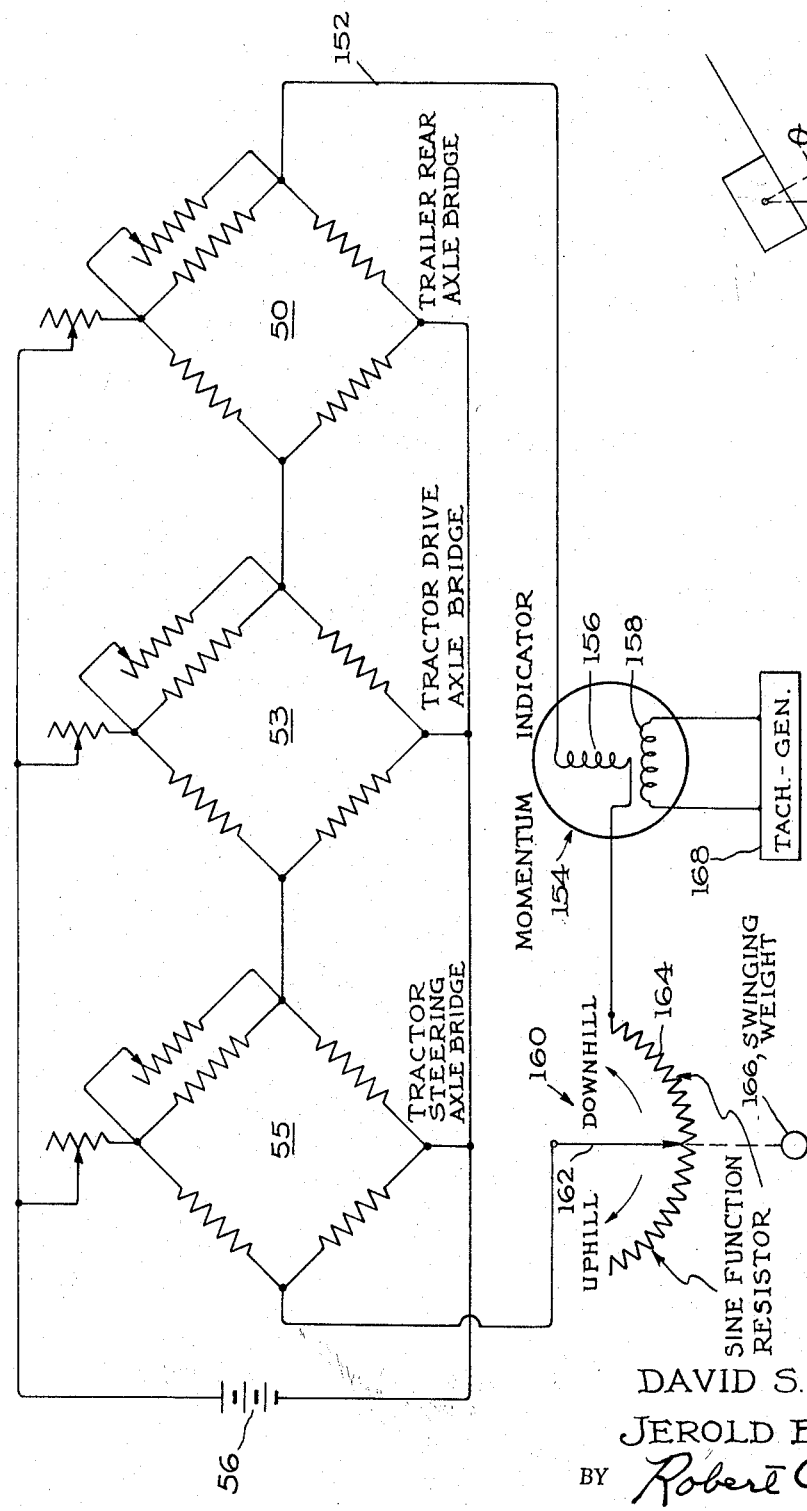
FIG. 8 is a schematic view of the momentum indicating device and the electrical circuit connection therefor.
Figure 8A:
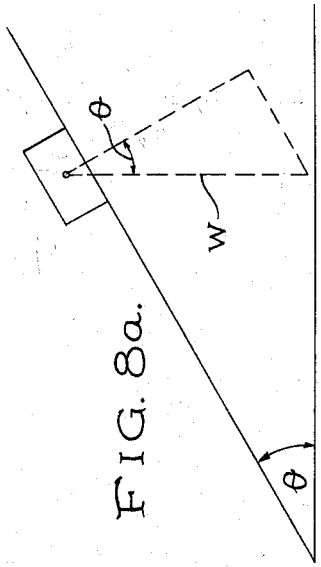
FIG. 8a is a schematic diagram showing resolution of weight components of a vehicle on an inclined highway.

Referring now to the drawings, there is shown in FIG. 1 a tractor-trailer combination, including a tractor 10 and a trailer 12, with the trailer being connected to the tractor by a kingpin 14 lying in the same vertical plane as the axis of the rear drive wheels of the tractor, or in a closely adjacent vertical plane, as is well known in the art.

The tractor 10 includes a front or steering axle 16, and a rear or drive axle 18, while the trailer 12 is supported adjacent the rear thereof by tandem axles 20 and 22. The two tandem axles 20 and 22 are mounted for sliding movement together longitudinally of the trailer body and may be longitudinally adjustable, for example, by as much as 12 feet on a trailer 40 feet in length. The two tandem axles 20 and 22 always remain a fixed distance apart from each other. On smaller trailers, a single rear axle may be provided instead of the two tandem axles 20 and 22.

As best seen in FIGS. 2 and 4, when the trailer 12 is unhooked from the tractor 10, it is supported by means of dolly wheels 24 mounted on a dolly wheel axle 26 which, in turn, is supported by bearings 28 at the lower ends of dolly wheel legs 30. The dolly wheel legs 30 are telescopically movable in cylindrical housings 31 supported by the underbody of the trailer. The dolly wheel legs 30 are moved downwardly out of the housings 31 by means of a suitable gearing mechanism which may be operated by manually rotating a crank.

Means are provided for measuring the weights on any of the individual axles of the tractor 10 or trailer 12, or on the dolly wheel legs 30, or for measuring the unhooked weight of the trailer, or the hooked-up weight of the tractor-trailer, as required.

Referring to FIG. 3, the body of trailer 12 is mounted on a supporting framework 32 which forms part of the trailer chassis. Leaf springs or other suitable springs 34 extend between the chassis framework 32 and the spring hangers 36 which are positioned adjacent but spaced from the innermost surface of the wheels 38 at each of the opposite ends of the two tandem axles 20–22. The spring hangers 36 are suitably secured to the axle or axle housing and in turn suitably secure the leaf springs 34 to the axle or axle housing. Spring hangers 36 may assume any form commonly used for this purpose. Strain gauges 40 which are preferably of the resistance type, are positioned on and are glued or otherwise suitably attached to each of the tandem axles 20–22 between the spring hangers 36 and the innermost surface of the adjacent wheel 38 at the corresponding end of each of the respective axles 20–22. Strain gauges 40 are similarly positioned on the front or steering axle 16 and on the rear drive axle 18 of the tractor 10. The strain gauges 40 may be positioned on the upper or lower surface of the axle and at each of the opposite ends of the axle.

By experimentation, it has been observed that the portion of the axle or axle housing between the spring hangers 36 and the innermost surface of the wheel reflects the highest and most reliable weight-to-strain ratio, whereas placement of strain gauges at points between the opposite spring hangers 36 on a given axle results in a negligible signal from the strain gauge. Measurement of the strain produced by the weight of the payload on the axle is vastly superior to measurement of the strain produced on the spring because of several different factors, including the following:

(1) Maximum representative stress of the load is exerted on the axle between the spring hanger and the innermost face of the adjacent wheel, and at no other point on the axle;

(2) The axle is a static member which does not become flaccid or distorted through use;

(3) The life of the axle or axle housing is equivalent to or exceeds that of the vehicle itself;

(4) Axle weight, which is the ultimate value to be determined, can be reflected most truly by the axle or axle housing as these are the only members which are strained only by the weight.

In some instances, particularly in the case of the rear or tandem axle of the trailer and the front steering axle of the tractor, the strain gauges are mounted directly on the axles, while in other instances, particularly in the case of the drive axles of the tractor, the strain gauges are mounted on the axle housing within which the axles are mounted for rotation. The term "axle member" or "axle means" used in the claims is intended to cover any stationary axle member upon which the strain gauges are mounted, including stationary axles, such as the tandem axles of the trailer, or the steering axle of the tractor, or a stationary axle housing, such as the axle housing for the tractor drive axle.

There is shown in FIG. 5 a simplified circuit diagram of a Wheatstone bridge circuit which may be used to measure the load on any given axle, as, for example, a single rear axle of a trailer having only one rear axle. The circuit of FIG. 5 includes the bridge arms 40A, 42, 44, and 40B. Arms 40A and 40B of the bridge are resistance strain gauges positioned at opposite ends of the axle on which the weight is being measured. Resistance 42 is in series with strain gauge 40A to complete one side of the Wheatstone bridge, while resistance 44 is in series with strain gauge 40B to complete the other side of the bridge. A zero calibrating resistance 46 is positioned in parallel relation to resistance 44 to balance the bridge to zero and to adjust for the unladen weight of the vehicle. A millivoltmeter 48 is positioned across the bridge in the conventional manner of Wheatstone bridges, between the strain gauge 40A and the resistance 42 on one side of the bridge, and between the parallel-connected resistance 44–46 and the strain gauge 40B on the opposite side of the bridge.

The millivoltmeter 48 of FIG. 5 may be calibrated in terms of weight by first balancing the bridge for zero payload and then progressively adding known weights at the center of the distance between the tandem axle of the trailer and the dolly wheel legs of the trailer, assuming that the trailer is unhooked and is supported at the forward end thereof by the dolly wheel legs. Under these conditions, half of the known weight will fall on the tandem axle and half on the dolly wheel legs. Thus, if the millivoltmeter which is being calibrated is connected to the bridge circuit of the tandem axle, for example, it is known that the weights which produce the given deflections of the millivoltmeter 48 are respectively equal to one-half of the centrally located progressively increased known weights. Thus, the deflections corresponding to the known weights permit calibration of the millivoltmeter 48.

In the bridge circuit of FIG. 5, if the resistance values of strain gauge 40A and resistance 44 were equal to each other, and if the resistance values of strain gauge 40B and resistance 42 were equal to each other, the bridge would be balanced at zero payload without the necessity of using balancing resistance 46. However, as a practical matter, the resistance values of strain gauges and resistors used in the Wheatstone bridge are never precisely equal and it is therefore necessary to adjust the zero calibrating resistance 46 to balance the bridge to provide a zero reading on millivoltmeter 48 at zero payload.

When the strain gauges 40A and 40B are placed on the axle, the axle is already strained due to the unladen weight of the vehicle (either the trailer or tractor depending upon which axle the strain gauges are positioned on). Hence, the unladen weight of the vehicle does not cause an unbalance of the bridge to produce a reading on millivoltmeter 48.

If it is desired to obtain a reading of the gross weight of the vehicle, including payload plus unladen vehicle weight, the component of unladen vehicle weight on any particular axle, which can be obtained from the manufacturer's specifications, can be added electrically to the output of the bridge of FIG. 5 by unbalancing the bridge by means of adjustable resistance 46 to provide a reading on meter 48 corresponding to the component of unladen vehicle weight on the given axle. Thus, the bridge will have a reading at zero payload corresponding to the component of inladen vehicle weight on the corresponding axle. Addition of payload will then further unbalance the bridge, the total reading of meter 48 corresponding to the component of gross weight on the respective axle.

A Wheatstone bridge similar to that shown in FIG. 5 may be provided for each of the axles. Normally, a single Wheatstone bridge will suffice for the two tandem axles 20–22, as will be explained more fully in connection with the circuit diagram of FIG. 6. The Wheatstone bridge circuit similar to that of FIG. 5 provided for each of the axles 16, 18, or 20–22 may be selectively connected to a common read-out device or millivoltmeter to permit the same read-out device or millivoltmeter to be used to detect the degree of unbalance of any one of the bridges, and thus of the weight on the corresponding axle. Also, the plurality of bridges associated with the plurality of axles 16, 18 and 20–22 may have their output voltages connected in series with each other to provide a cumulative or summation reading indicative of the total weight on all of the axles 16, 18, and 20–22, to thereby give the total weight of the hooked-up tractor-trailer.

It is important, of course, that the Wheatstone bridges for all of the axles and for the dolly wheel legs be calibrated and adjusted so that with the normal supply voltage to the respective bridges the output or unbalance voltage for the respective bridges is the same for a given weight.

Description of electrical circuitry of FIG. 6

The circuit arrangement shown in FIG. 6 permits the weight of the unhooked trailer to be projected into the equivalent weight readings of the hooked-up tractor trailer, as will now be described. The circuitry of FIG. 6 also permits readings to be taken of the weights on the individual axles, and also of the total weight of the unhooked trailer, as well as the weight of the hooked-up tractor trailer.

Referring now to FIG. 6, there is shown a Wheatstone bridge generally indicated at 50 for the strain gauges on the tandem axles 20–22, and a Wheatstone bridge generally indicated at 52 for the strain gauges on the dolly wheel legs 30.

Wheatstone bridge 50 for the tandem axles includes on one side thereof the series-connected strain gauges 40c and 40d which are respectively positioned on the left top surface of the rear tandem axle 22 and on the the left bottom surface of the front tandem axle 20. The opposite side of Wheatstone bridge 50 includes the series-connected strain gauges 40e and 40f which are respectively mounted on the right bottom surface of rear tandem axle 22 and on the right top surface of front tandem axle 20. A zero adjusting resistance 54 for bridge 50 is connected in parallel with strain gauge 40e of the bridge.

A direct current power supply for both bridges 50 and 52 is indicated at 56 and the input terminal 58 of bridge 50 between strain gauges 40d and 40f is connected by conductor 60 to one side of power supply 56. The opposite power input terminal 62 of bridge 50 between strain gauges 40c and 40e is connected by conductor 64 in series with an adjustable calibrating resistance 66 to terminal 70 of a selector switch generally indicated at 72. Selector switch 70 includes two poles or movable contacts 74 and 76.

The Wheatstone bridge 52 for the dolly wheel legs 30 includes the series-connected strain gauges 40g and 40h on one side of the bridge, these two strain gauges being respectively connected to the left and right dolly wheel legs 30. The opposite side of bridge 52 includes the series-connected strain gauges 40i and 40j which are respectively connected to the left and right dolly wheel legs 30. A zero adjusting resistance 78 is connected in parallel with strain gauge 40j. One side of the power supply 56 is directly connected by conductor 82 to input terminal 80 of bridge 52, while the opposite input terminal 84 of bridge 52 is connected by conductor 86 in series with adjustable calibrating resistance 88 to the slidable adjusting tap 92 of variable resistor 90, and also to the slidable adjusting tap 93 of variable resistor 91. One end of the variable resistor 90 is connected to terminal 94 of selector switch 72 where it may be engaged by movable contact 76 of the selector switch 72 to complete the connection of bridge 52 to power supply 56. Similarly, one end of variable resistor 91 is connected to terminal 95 of selector switch 72 where it may be engaged by movable contact 76 of the selector switch 72 to provide an alternative connection of bridge 52 to power supply 56 when a reading is being taken of the projected tandem axle weight of the hooked-up trailer based upon the unhooked weight readings of the trailer.

Variable resistor 90 may be included in the circuit from voltage supply 56 to input terminal 84 of bridge 52 by moving selector switch contact 76 into engagement with terminal 94 of selector switch 76 to provide a voltage input to dolly wheel bridge 52 such that the output voltage of the bridge satisfies the equation $$W_c = \frac{L_1}{L_2}(W_b)$$

when the circuit is being used to project the weight of the unhooked trailer to give the weight $W_c$ on the rear drive axle 18 of the hoked-up tractor trailer. Since the bridge 52 gives the weight $W_b$ on the dolly wheel legs 30 as indicated by the diagram of FIG. 2, adjustment of the input voltage to bridge 52 in accordance with the ratio $L_1/L_2$ will cause the deflection or output voltage due to unbalance of the bridge 52 to be changed by the same ratio so that the output voltage of the bridge gives the projected weight at the kingpin of the trailer based on the unhooked weight on the dolly wheel legs. In projecting the weight $W_b$ on the dolly wheel legs to get the weight $W_c$ at the kingpin, in accordance with the equation $$W_c = \frac{L_1}{L_2}(W_b)$$

the adjustable resistance 78 of dolly wheel bridge 52 should be adjusted to provide a bridge unbalance sufficient to give a reading on meter 48' of the component of unladen trailer weight at the kingpin 14. This component of unladen trailer weight at the kingpin is a constant value which can be obtained from or calculated on the bases of the manufacturer's specifications relating to the unladen weight of the trailer and the location of the tandem axle relative to the center of gravity of the unladen trailer.

Variable resistor 91 may be included in the circuit from voltage supply 56 to input terminal 84 of bridge 52 by moving selector switch contact 76 into engagement with terminal 95 of switch 72 to provide a voltage input to dolly wheel bridge 52 such that the voltage input to bridge 52 is multiplied by the ratio $$\frac{L_2 - L_1}{L_2}$$

As indicated by Equation 25, in order to get the projected hooked-up trailer tandem axle weight $W_{a2}$, it is necessary to satisfy the equation:

$$W_{a2} = W_a + \frac{L_2 - L_1}{L_2}(W_b)$$

Therefore, to obtain the projected value of the trailer tandem axle weight for the hooked-up trailer, based on the unhooked trailer weight readings, it is necessary to serially connect the output voltages of bridge 50 and of bridge 52, with the input voltage of dolly wheel bridge 52 being connected in series with variable resistor 91, so that the input voltage to bridge 52 is multiplied by the ratio $$\frac{L_2 - L_1}{L_2}$$

The summation of the two output voltages of bridges 50 and 52 under these conditions as read upon read-out device 48' will then give the projected value of $W_{a2}$, the projected hooked-up weight on the rear axle or tandem axles of the trailer. In projecting the weight on the dolly wheel legs to get the projected hooked-up trailer tandem axle weight in accordance with the equation $$W_{a2} = W_a + \frac{L_2 - L_1}{L_2}(W_b)$$

the adjustable resistance 78 of dolly wheel bridge 52 should be adjusted to provide a bridge unbalance sufficient to give a reading on meter 48' of the unladen trailer weight at the center line of the tandem axles 20–22. This component can be calculated on the basis of manufacturer's specifications relating to the unladen weight of the trailer and the location of the tandem axle relative to the center of gravity of the unladen trailer.

Terminal 84 of dolly wheel strain gauge 52 is also connected to a terimnal 96 of selector switch 72 which may be engaged by movable contact 76 of selector switch 72 to permit by-passing of both of the adjustable resistors 90 and 91 when it is not desired to multiply the output of bridge 52 by either the ratio $L_1/L_2$ or $$\frac{L_2 - L_1}{L_2}$$

Instead of providing two ratio resistors 90 and 91 and selectively connecting these resistors into the input power supply to dolly wheel bridge 52, as just explained, a single ratio adjusting resistance, such as the resistance 90, may be provided and be readjusted by means of the sliding tap 92 to obtain the desired ratio, either $L_1/L_2$ for use in obtaining the projected tractor drive axle weight, or the ratio $$\frac{L_2 - L_1}{L_2}$$

for use in obtaining the projected tandem axle weight.

The circuit of FIG. 6 includes a meter or read-out device 48' which is connected to a selector switch generally indicated at 98 including two movable contacts 100 and 102.

The output circuits of the strain gauge Wheatstone bridges for each of the respective axles and also for the dolly wheel legs 30 are connected to terminals adjacent the movable contacts 100, 102 of selector switch 98 to permit selective connection of any one of the Wheatstone bridges to the read-out device or meter 48' and also to permit the series connection of various of the bridge output circuits to provide a reading of the total weight either on the unhooked trailer or on the hooked tractor-trailer combination. Thus, the output circuit of Wheatstone bridge 50 for the tandem axles 20–22 is connected by conductors 104 and 106 to terminals 108 and 110, respectively, so that when selector switch contacts 100 and 102 are respectively moved into contact with terminals 108 and 110, the weight on the tandem axles 20–22 can be read on read-out device 48'. Similarly, the output circuit of the dolly wheel strain gauge Wheatstone bridge 52 is connected by conductors 112 and 114, respectively, to terminals 116 and 118 so that when selector switch contacts 100 and 102 are engaged with terminals 116 and 118, the weight on the dolly wheel legs can be observed. It should be noted that if the conductor 86 which connects strain gauge bridge 52 to power supply 56 is connected in series with ratio resistance 90, the reading obtained on readout device 48′ will give the project value of $W_c$, the projected weight on kingpin 14 of the trailer.

If selector switch contact 76 is moved into engagement with terminal 95, the ratio resistance 91 is included in the circuit from the power supply 56 to input terminal 84 of dolly wheel bridge 52. This will multiply the voltage input to bridge 52 by the ratio $$\frac{L_2 - L_1}{L_2}$$

If the voltage output of bridge 52 is then connected in series with the voltage output of bridge 50, a direct reading is obtained on read-out device 48′ of the projected value of $W_{a2}$, the hooked-up weight on the rear on tandem axles 18 or 18′ of the trailer.

If the switch contact 76 of selector switch 72 is engaged with terminal 96 to by-pass ratio resistances 90 and 91, the reading obtained on read-out device 48′ from the output circuit of dolly wheel bridge 52 will indicate the actual weight on the dolly wheel legs 30.

The output from the strain gauge Wheatstone bridge for rear drive axle 18 of tractor 10 is connected by conductors 120 and 122 to the respective terminals 124 and 126 so that when selector switch contacts 100 and 102 are connected across terminals 124 and 126, a direct reading of the weight on rear axle 18 or axles 18′ of tractor 10 is obtained on read-out device 48′.

Also, the output of the Wheatstone bridge for the strain gauges of the front steering axle 16 of the tractor is connected by conductors 128 and 130 to the terminals 132 and 134, respectively, so that when selector switch contacts 100 and 102 are connected across terminals 132 and 134, the weight on front steering axle 16 may be read directly on read-out device 48′.

Power supply 56 is connected by conductors 135 and 137 to the power input terminals of the Wheatstone bridges for the front steering axle 16 and for the drive axle 18 of the tractor.

It is also possible, with the circuit arrangement shown in FIG. 6 with the trailer unhooked to connect the outputs of the Wheatstone bridges 50 and 52 for the tandem axles and dolly wheels, respectively, in series with each other to provide a summation of the weight on the tandem axles and on the dolly wheel legs, to give the total weight of the unhooked trailer, as indicated by the equation: $W = W_a + W_b$.

This may be accomplished by moving movable switch contact 102 into engagement with terminal 118 to connect one side of read-out device 48′ to one side of the output of dolly wheel Wheatstone bridge 52, closing switch 136 to connect conductor 112 of the output circuit of dolly wheel bridge 52 to conductor 106 of the output circuit of tandem axle bridge 50, then closing switch contact 100 into engagement with terminal 108 to thereby complete the series connection of bridges 50 and 52 across readout device 48′. The connections just described will give a reading on the read-out device 48′ which is the sum of the output voltages of bridges 50 and 52, to thereby give the total weight on the unhooked trailer. With the connections just described, movable contact 76 of selector switch 72 should be connected to terminal 96 to thereby cause the power input circuit to dolly bridge 52 to by-pass the ratio resistances 90 and 91, since, with the series connection of the tandem axle bridge 50 and the dolly wheel bridge 52, the output of bridge 52 should not be multiplied by either of the factors $L_1/L_2$ or $$\frac{L_2 - L_1}{L_2}$$

as previously described, but should provide a direct reading of the weight on the dolly wheel legs 30.

With the tractor-trailer hooked up, the circuit of FIG. 6 can be used to obtain a total reading of the weights on the front steering axle 16, the rear drive axle 18, and on the tandem axles 20–22 by connecting the output voltages of the bridge circuits of these respective axles in series relation with each other to give the total weight on the axles of the hooked-up tractor-trailer. This may be accomplished by the circuit of FIG. 6 in the following manner: By closing selector switch contact 100 into engagement with terminal 134, read-out device 48′ is connected to one side of the output circuit of the Wheatstone bridge for the front steering axle 16 of the tractor-trailer. The other side of the output circuit of the Wheatstone bridge for steering axle 16 is connected by conductor 128 to terminal 132, to which is affixed a movable switch contact 138 which may be moved into engagement with terminal 124 to provide a connection from the output circuit of the Wheatstone bridge of steering axle 16 to conductor 120 leading to one side of the output of the strain gauge Wheatstone bridge of rear drive axle 18 of the tractor. The opposite side of the output circuit of the Wheatstone bridge for drive axle 18 is connected to conductor 122, and by moving switch 126 at the end of conductor 122 into engagement with terminal 108, the output of the strain gauge bridge circuit for tractor drive axle 18 is connected to one side of the output circuit of tandem axle Wheatstone bridge 50. The opposite side of the output circuit of tandem axle bridge 50 is connected by conductor 106 to terminal 110, and by moving the selector switch contact 102 into engagement with terminal 110, the series circuit of the outputs of bridges for the steering axle 16, the tractor drive axle 18, and the tandem axles 20–22 of the trailer is completed back to read-out device 48′ to provide a reading of the total weights on the steering axle 16, the tractor drive axle 18, and the tandem axles 20–22.

In making the series connections just described, it is, of course, important that polarities of the output voltages be observed to obtain the proper additive relation of the output voltages of the various bridges.

In the installation of the electrical circuitry shown in FIG. 6, connections to the various strain gauges on the trailer may be brought out to plug-in receptacles on the exterior of the trailer body to permit connection to an external bench or console having the remainder of the circuitry and the readout equipment, to provide convenient readings of the weight on the unhooked trailer as it is being loaded. Also, if desired, plug-in receptacles may be provided on the external surface of the tractor for connection of the strain gauges on the tractor axles to external circuitry and read-out equipment.

Utilizing the external plug-in receptacles and the electrically conducting connections between the trailer and the tractor, read-out equipment may be attached at any location on the inside of the tractor. The read-out equipment would include the indicating meter 48, the power supply 56, and may or may not include switches 95 and 98. Switches 95 and 98 could be mounted on the trailer or could be mounted externally of the trailer.

Readings may be taken on the unhooked trailer weights at a loading platform, using read-out equipment at an external bench, as previously mentioned. Also, readings may be taken of the hooked weight of the tractor-trailer at a highway check point, the readings being taken either on read-out equipment in the cab of the tractor, or on external equipment at the highway check point. Also, readings may be taken on read-out equipment in the cab of the tractor when picking up loads, or when unloading, to determine the weight of the pick-up load or the amount of weight unloaded.

*Momentum indicating device*

There is schematically shown in FIG. 8 the circuit of a momentum-indicating device which may be used to indicate the momentum of a moving truck or vehicle. The system of FIG. 8 includes strain gauge bridges 50, 53, and 55, which respectively measure the weight on the rear axle or tandem axles of the trailer, on the drive axle 18 of the tractor, and on the steering axle 16 of the tractor.

As has been previously explained, the total voltage output of these three bridges when connected in series additive relation to each other indicates the total weight of the hooked-up tractor trailer. The respective bridges are adjusted as previously explained so that the reading on each bridge includes the sum of the components of unladen weight and payload weight on the respective axles, so that the summation of the voltages of the three bridges 50, 53, and 55 represents the total or gross weight of the loaded tractor trailer, including the unladen weight plus the net or payload weight. The three bridges 50, 53, and 55 have their input terminals respectively connected to power supply 56. The voltage outputs of the three bridges 50, 53, 55 are connected in series with each other, the summation of the voltage of the three bridges being across the two conductors 150 and 152 at opposite ends of the series-connected bridges.

The momentum indicator is generally indicated at 154 and is preferably an electrical instrument of the electrodynamometer type, similar to the conventional wattmeter, including two coils 156 and 158, one of which is fixed, and the other of which is movable. In the embodiment of FIG. 8, it is assumed that coil 156 is movable and coil 158 is fixed.

Moving coil 156 is connected across the output voltage of the three bridges 50, 53, and 55, in series with an inclinometer which compensates for the effect on momentum of the angle of inclination of the roadway on which the vehicle is moving. The inclinometer 160 includes a movable tap member 162 which is swingably movable along an arcuate resistance 164 due to the connection of tap 162 to a swinging weight whose position relative to resistance 164 varies in accordance with the angular inclination of the truck or tractor-trailer. Resistance 164 varies on either side of the midpoint thereof (which corresponds to the position of tap 162 when the vehicle is on a horizontal surface), as a function of the sine of the angle of inclination of the vehicle relative to the horizontal. Variable resistors having a resistance value which varies as a sine function are known and are shown, for example, by United States Patents 2,554,811—Bromberg et al., and 2,979,681—Brown.

The inclinometer 160 is mounted in such manner that when the tractor-trailer moves downhill, movable weight 166 will move tap 162 to the right with respect to the view in FIG. 8 to thereby reduce the amount of resistance 164 in series with coil 156 as a function of sine $\theta$, and to move tap 162 to the left with respect to the view in FIG. 8 if the truck moves uphill, to thereby increase the amount of resistance 164 in series with coil 156 as a function of sine $\theta$. Thus, when the tractor moves downhill, less resistance 164 will be in series with coil 156 and an increased current will flow through coil 156 from the voltage output of the series-connected bridges 150, 153, 155 to compensate for the fact that the weight contributing to the momentum of the vehicle is greated than when the vehicle is moving on a level surface. When the vehicle moves uphill, the swinging weight 166 moves to the left with respect to the view in FIG. 8 and moves tap 162 to increase the amount of resistance 164 in series with coil 156, and thereby decreases the current flow through coil 156 for a given output voltage of bridges 150, 153, 155, thereby compensating for the fact that when the truck is moving uphill the component of weight contributing to the momentum is less than when the truck is traveling on level ground. When the truck is traveling on level ground, the tap 162 is at substantially the midpoint of the resistor 164, as indicated in FIG. 8.

A tachometer-generator 168 which has a voltage output proportional to the speed of the vehicle has its electrical output connected across the fixed coil 158. Thus, torque produced upon the moving coil 156 is proportional to the product of the currents through the two coils 156 and 158, and thus to the product of the speed of the vehicle, as measured by tachometer generator 168, and of the weight of the vehicle, measured by the strain gauge bridges 50, 53, 55, with the voltage output of the bridges being modified in accordance with the angular inclination of the vehicle as it moves along the highway, so that only the component of weight adding to or subtracting from the momentum of the moving vehicle is fed into coil 156. The movement of the moving coil 156, and of the pointer moved thereby, will thus always be proportional to the product of the speed of the vehicle and of the component of weight of the vehicle which is contributing to the momentum.

It can be seen that there is provided in accordance with this invention a momentum indicating device which gives an indication of the momentum of the moving tractor-trailer based on the speed of the tractor-trailer and on the component of weight of the tractor trailer which contributes to the momentum.

While there has been shown and described a particular embodiment of the invention, it will be obvious to those skilled in the art that various changes and modifications may be made therein without departing from the invention and, therefore, it is aimed to cover all such changes and modifications as fall within the true spirit and scope of the invention.

What we claim as our invention is:

1. In combination with a motive vehicle, an apparatus for quantitatively measuring the momentum of said vehicle when in motion, comprising means for measuring the speed of said vehicle and for providing a first indication quantitatively representative of the speed, means for measuring the weight component of the vehicle and its contents acting in the direction of motion of the vehicle to provide a second indication quantitatively representative of said weight component, and means for combining said first and second indications to provide a third indication quantitatively representative of the momentum of the vehicle.

2. In combination with a motive vehicle, an apparatus for quantitatively measuring the momentum of said vehicle when in motion, comprising means for measuring the speed of said vehicle and for providing a first electrical signal quantitatively representative of the speed, means for measuring the weight component of the vehicle and its contents acting in the direction of motion of the vehicle and for providing a second electrical signal quantitatively representative of said weight component, and means for combining said first and second electrical signals to provide a third electrical signal quantitatively representative of the momentum of the vehicle.

3. In combination with a motive vehicle, an apparatus for measuring the momentum of said vehicle when in motion, comprising an electrical meter of the dynamometer type including a fixed coil and a movable coil, means for measuring the speed of said vehicle and causing a first electrical current to flow through one of said coils quantitatively representative of the speed, means for measuring the weight component of the vehicle and its contents acting in the direction of motion of the vehicle and for causing a second electrical current quantitatively representative of the weight measurement to flow through the other of said coils, whereby the interaction of the current flows through the respective coils causes a motion of said movable coil quantitatively representative of the momentum of the vehicle.

4. In combination with a motive vehicle, an apparatus for measuring the momentum of the vehicle when in motion, comprising means for measuring the speed of said vehicle and for providing a first indication representative of the speed, means for measuring the weight of the vehicle and its contents, means for measuring the angle of inclination of the vehicle relative to the horizontal plane and for multiplying said weight measurement by a function of the angle of inclination to provide a second indication representative of the weight component of the vehicle and its contents acting in the direction of motion of the vehicle, and means for combining said first and second indications to provide a third indication representative of the momentum of the vehicle.

5. An apparatus for measuring the momentum of a moving vehicle, comprising means for measuring the speed of said vehicle and for providing a first electrical signal quantitatively representative of the speed, means for measuring the weight component of the vehicle and its contents acting in the direction of motion of the vehicle and for providing a second electrical signal quantitatively representative of said weight component, and means for combining said first and second electrical signals to provide a third electrical signal quantitatively representative of the momentum of the vehicle.

6. An apparatus for measuring the momentum of a moving vehicle, comprising an electrical meter of the dynamometer type including a fixed coil and a movable coil, means for measuring the speed of the vehicle and causing a first electrical current to flow through one of said coils quantitatively representative of the speed, means for measuring the weight component of the vehicle and its contents acting in the direction of motion of the vehicle and for causing a second electrical current quantitatively representative of said weight component measurement to flow through the other of said coils, whereby the interaction of the current flows through the respective coils causes a motion of said movable coil quantitatively representative of the momentum of the vehicle.

7. An apparatus for measuring the momentum of a moving vehicle, comprising an electrical meter of the dynamometer type including a fixed coil and a movable coil, means for measuring the speed of the vehicle and for causing a first electrical current to flow through one of said coils representative of the speed, means for measuring the weight of the vehicle and its contents, means for measuring the angle of inclination of the vehicle relative to a horizontal plane and for multiplying the weight measurement by a function of the angle of inclination of the vehicle to cause a second electrical current representative of the weight component of the vehicle and its contents acting in the direction of motion of the vehicle to flow through the other of said coils, whereby the interaction of the current flows through the respective coils causes a motion of said movable coil representative of the momentum of the vehicle.

8. In combination with a motive vehicle, an apparatus for measuring the momentum of the vehicle when in motion, comprising means for measuring the speed of said vehicle and for providing a first indication representative of the speed, means for measuring the weight of the vehicle and its contents, means for measuring the angle of inclination of the vehicle relative to the horizontal plane and for multiplying said weight by the sine of the angle of inclination of the vehicle relative to the horizontal plane to provide a second indication representative of the weight component of the vehicle and its contents acting in the direction of motion of the vehicle, and means for combining said first and second indications to provide a third indication representative of the momentum of the vehicle.

References Cited

UNITED STATES PATENTS

| 2,838,232 | 6/1958 | Gilbert | 235—194 |
| 3,175,082 | 3/1965 | Mishelevich | 246—182 |
| 3,214,581 | 10/1965 | Coley | 246—182 |
| 3,234,378 | 2/1966 | Gallacher | 246—182 |

MALCOLM A. MORRISON, *Primary Examiner.*

I. KESCHNER, *Assistant Examiner.*